United States Patent
Choi (10) Patent No.: US 10,504,434 B2
(45) Date of Patent: Dec. 10, 2019

(54) DC-DC CONVERTER AND DISPLAY DEVICE HAVING THE SAME

(71) Applicant: SAMSUNG DISPLAY CO., LTD., Yongin, Gyeonggi-Do (KR)

(72) Inventor: Hak-Ki Choi, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 231 days.

(21) Appl. No.: 14/797,501

(22) Filed: Jul. 13, 2015

(65) Prior Publication Data
US 2016/0260382 A1    Sep. 8, 2016

(30) Foreign Application Priority Data

Mar. 3, 2015    (KR) .................. 10-2015-0029623

(51) Int. Cl.
| | |
|---|---|
| G09G 3/3258 | (2016.01) |
| H02M 1/36 | (2007.01) |
| H02M 3/155 | (2006.01) |
| H02M 3/158 | (2006.01) |
| G09G 3/20 | (2006.01) |
| G09G 3/3225 | (2016.01) |
| H02M 1/00 | (2006.01) |
| H02M 1/32 | (2007.01) |

(52) U.S. Cl.
CPC ......... *G09G 3/3258* (2013.01); *G09G 3/2003* (2013.01); *G09G 3/3225* (2013.01); *H02M 1/36* (2013.01); *H02M 3/155* (2013.01); *H02M 3/158* (2013.01); *G09G 2330/02* (2013.01); *G09G 2330/027* (2013.01); *G09G 2330/028* (2013.01); *H02M 2001/008* (2013.01); *H02M 2001/322* (2013.01)

(58) Field of Classification Search
CPC ...... H02M 3/335; H02M 3/155; H02H 7/125; H02H 3/18; G09G 3/10; G09G 3/30; G09G 3/36; G05F 1/575; H03K 17/687; H02J 1/00
See application file for complete search history.

(56) References Cited

U.S. PATENT DOCUMENTS

| | | | | |
|---|---|---|---|---|
| 6,256,182 B1 * | 7/2001 | Suzuki | ............ | G06F 1/26 307/125 |
| 6,664,772 B2 | 12/2003 | Saeki et al. | | |

(Continued)

FOREIGN PATENT DOCUMENTS

| | | |
|---|---|---|
| EP | 2 031 941 A2 | 3/2009 |
| EP | 2 608 389 A1 | 6/2013 |

(Continued)

OTHER PUBLICATIONS

Extended European Search Report dated Jul. 5, 2016 in Corresponding European Patent Application No. 16157873.7.

*Primary Examiner* — Priyank J Shah
(74) *Attorney, Agent, or Firm* — Lewis Roca Rothgerber Christie LLP (57) ABSTRACT

A DC-DC converter includes a plurality of converters and a discharging circuit. The converters convert an input power voltage from an input terminal to a plurality of output power voltages for output to a plurality of output terminals. The discharging circuit is between the input terminal and the converters and discharges of voltages of the output terminals based on a discharging control signal.

17 Claims, 7 Drawing Sheets

(56) References Cited

U.S. PATENT DOCUMENTS

| | | | | |
|---|---|---|---|---|
| 2004/0012340 | A1* | 1/2004 | Yasuda | G09G 3/3233 |
| | | | | 315/169.3 |
| 2007/0057898 | A1* | 3/2007 | Nakajima | H02M 3/073 |
| | | | | 345/100 |
| 2008/0252277 | A1* | 10/2008 | Sase | H02M 3/157 |
| | | | | 323/283 |
| 2009/0290385 | A1* | 11/2009 | Jungreis | H02M 1/4241 |
| | | | | 363/17 |
| 2011/0316841 | A1* | 12/2011 | Kim | G09G 3/3208 |
| | | | | 345/212 |
| 2012/0274134 | A1* | 11/2012 | Gasparini | H02M 3/1584 |
| | | | | 307/31 |
| 2013/0279219 | A1* | 10/2013 | Oki | H02M 1/32 |
| | | | | 363/53 |

FOREIGN PATENT DOCUMENTS

| | | |
|---|---|---|
| EP | 2 637 159 A1 | 9/2013 |
| EP | 2 728 731 A2 | 5/2014 |
| JP | 2000-214830 A | 8/2000 |
| JP | 2008-067454 A | 3/2008 |
| KR | 10-2003-0095621 A | 12/2003 |
| KR | 10-0735478 B1 | 6/2007 |
| KR | 10-2009-0021742 A | 3/2009 |

* cited by examiner

DC-DC CONVERTER AND DISPLAY DEVICE HAVING THE SAME

CROSS REFERENCE TO RELATED APPLICATION

Korean Patent Application No. 10-2015-0029623, filed on Mar. 3, 2015, and entitled, "DC-DC Converter and Display Device Having the Same," is incorporated by reference herein in its entirety.

BACKGROUND

1. Field

One or more embodiments described herein relate to a DC-DC converter and a display device having a DC-DC converter.

2. Description of the Related Art

Flat panel displays are widely used in electronic devices because they are light and thin compared to cathode-ray tube displays. Examples of flat panel displays include liquid crystal displays, plasma display panels, and organic light emitting displays.

A DC-DC converter may convert an input power voltage to an output power voltage for driving a flat panel display. The output power voltage is used to power pixels via power lines. One type of DC-DC converter includes an output capacitor having a large capacitance to stably maintain the output power voltage. However, the capacitor discharging time may be significant and abnormal light emission may occur as a result.

SUMMARY

In accordance with one or more embodiments, a DC-DC converter includes a plurality of converters to convert an input power voltage from an input terminal to a plurality of output power voltages for output to a plurality of output terminals; and a discharging circuit between the input terminal and the converters, the discharging circuit to discharge voltages of the output terminals based on a discharging control signal.

The discharging circuit may include a first discharging switching circuit between a first node connected to the converters and a reference terminal, and the first discharging switching circuit may turn on based on the discharging control signal. The discharging circuit may include a second discharging switching circuit between the input terminal and the first node, and the second discharging switching circuit may turn off based on the discharging control signal. Each of the first discharging switching circuit and the second discharging switching circuit may includes metal-oxide semiconductor transistors of different types from each other.

The DC-DC converter may include an input capacitor between the first node and the reference terminal. The DC-DC converter may include an input capacitor between the input terminal and the reference terminal. The DC-DC converter may include a plurality of output capacitors, wherein each of the output capacitors is between a respective one of the output terminals and a reference terminal.

Each of the converters may include a switching circuit including a plurality of switches and at least one inductor; and a switch controller to control switching operations of the switches to convert the input power voltage to one of the output power voltages. The switching circuit may include a first switch between the discharging circuit and a second node; a second switch between the second node and a reference terminal; and a first inductor between the second node and one of the output terminals.

The switching circuit may include a third switch between the discharging circuit and a third node; second inductor between the third node and a reference terminal; and a fourth switch between the third node and one of the output terminals. The switching circuit may include a third inductor between the discharging circuit and a fourth node; a fifth switch between the fourth node and a reference terminal; and a sixth switch between the fourth node and one of the output terminals. The switch controller may control the switching circuit to connect the output terminals to the discharging circuit based on the discharging control signal.

In accordance with one or more other embodiments, a display device includes a display panel including a plurality of pixels; a scan driver to provide a scan signal to the pixels; a data driver to provide a data signal to the pixels; and a DC-DC converter to generate a plurality of output power voltages to be provided to the pixels, wherein the DC-DC converter includes: a plurality of converters to convert an input power voltage from an input terminal to the output power voltages for output to a plurality of output terminals; and a discharging circuit between the input terminal and the converters, the discharging circuit to discharge voltages of the output terminals based on a discharging control signal.

The discharging circuit may include a first discharging switch between a first node connected to the converters and a reference terminal, the first discharging switch to turn on based on the discharging control signal. The discharging circuit may include a second discharging switch between the input terminal and the first node, the second discharging switch to turn off based on the discharging control signal.

The DC-DC converter may include an input capacitor between the first node and a reference terminal. The DC-DC converter may include an input capacitor between the input terminal and a reference terminal. The DC-DC converter may include a plurality of output capacitors, wherein each of the output capacitors is between a respective one of the output terminals and a reference terminal.

The pixels may include a red color pixel, a green color pixel, and a blue color pixel, wherein the DC-DC converter may provide the output voltages to the red color pixel, the green color pixel, and the blue color pixel, respectively, and wherein the output voltages may be different from one another. The pixels may include a plurality of p-type metal-oxide semiconductor transistors.

In accordance with one or more other embodiments, a DC-DC converter includes a plurality of converters to convert a first power voltage to a plurality of second power voltages for output to pixels of a display through output terminals; and a discharging circuit to discharge third voltages of the output terminals based on a discharging control signal, wherein the second power voltages are different from one another and wherein discharging control signal is generated when a power mode of the display switches from a first state to a second state. The first state may be a normal display state (e.g., for displaying images) and the second state may be a low power state or an off state.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments. Like reference numerals refer to like elements throughout.

Figure 1:
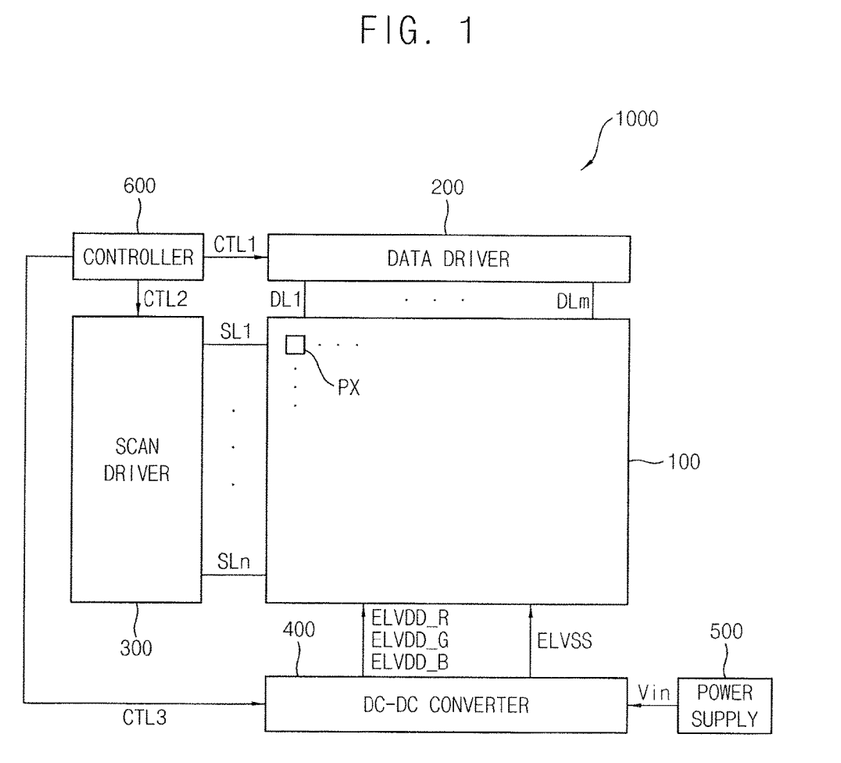
FIG. 1 illustrates an embodiment of a display device.

FIG. 1 illustrates an embodiment of a display device 1000 which includes a display panel 100, a data driver 200, a scan driver 300, a DC-DC converter 400, a power supply 500, and a controller 600.

The display panel 100 is connected to the data driver 200 via data lines DL1 through DLm and the scan driver 300 via scan lines SL1 through SLn. The display panel 100 includes a plurality of pixels PX (e.g., n*m pixels) arranged at crossing points of the scan lines SL1 through SLn and the data lines DL1 through DLm. In one example embodiment, the pixels PX may include a red color pixel, a green color pixel, and a blue color pixel. The data driver 200 provides data signals to the pixels PX via the data lines DL1 through DLm. The scan driver 300 provides a scan signal to the pixels PX via the scan lines SL1 through SLn.

The DC-DC converter 400 generates a plurality of output power voltages for the pixels PX. In one embodiment, the DC-DC converter 400 includes a plurality of converters and a discharging circuit. The converters convert an input power voltage Vin from an input terminal to the output power voltages, e.g., ELVDD_R, ELVDD_G, ELVDD_B, and ELVSS. The converters output the output power voltages to output terminals. The discharging circuit is connected between the input terminal and the converters and operates to discharge voltages of the output terminals based on a discharging control signal.

In one example embodiment, the discharging circuit includes a first discharging switching element connected between a first node connected to the converters and a reference (e.g., ground) terminal. The first discharging switching element may be turned on based on the discharging control signal. In one example embodiment, the discharging circuit may further include a second discharging switching element connected between the input terminal and the first node. The second discharging switching element may be turned off based on the discharging control signal.

In one example embodiment, the DC-DC converter 400 provides the output power voltages to the color pixels PX. For example, the DC-DC converter 400 may provide output power voltages that are different from each other to the red color pixel, the green color pixel, and the blue color pixel, respectively. The DC-DC converter 400 may provide a first high power voltage ELVDD_R and a low power voltage ELVSS to the red color pixel. The DC-DC converter 400 may provide a second high power voltage ELVDD_G and the low power voltage ELVSS to the green color pixel. The DC-DC converter 400 may provide a third high power voltage ELVDD_B and the low power voltage ELVSS to the blue color pixel.

The power supply 500 may provide the input power voltage Vin to the DC-DC converter 400. The power supply 500 may be, for example, a battery providing the DC voltage or a rectifier that converts an AC voltage to a DC voltage.

The controller 600 generates a plurality of control signals CTL1 through CTL3 to control the data driver 200, the scan driver 300, and the DC-DC converter 400. In one example embodiment, the controller 600 provides the discharging control signal to the DC-DC converter 400 to discharge voltages of the output terminals when power of the display device 1000 is off or changes from a first power state to a second power state (e.g., a reduced power state). As a result, the display device 1000 may efficiently discharge the voltages of the output terminals using one discharging circuit, thereby reducing manufacturing costs and preventing abnormal emission that might otherwise occur by a long discharging time.

Figure 2:
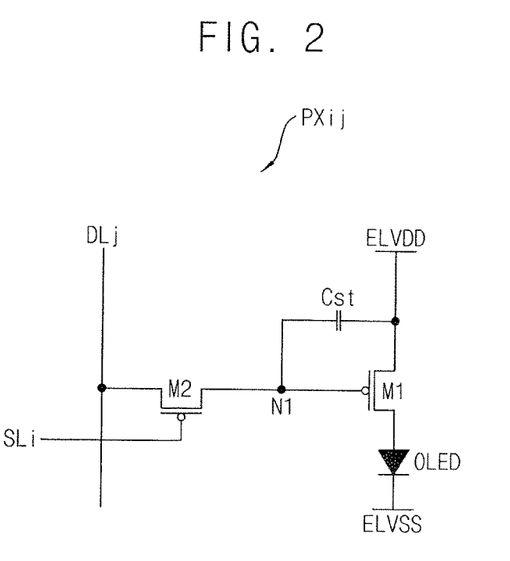
FIG. 2 illustrates an embodiment of a pixel.

FIG. 2 illustrates an embodiment of a pixel PXij which is representative of the pixels in the display panel 1000. The pixel PXij includes a plurality of p-type metal-oxide semiconductor (MOS) transistors. For example, the pixel PXij may include a first transistor M1, a second transistor M2, a capacitor Cst, and an organic light emitting diode OLED.

The first transistor M1 is connected between a high power voltage ELVDD and the organic light emitting diode OLED. A control electrode of the first transistor M1 is connected to a first node N1. The first transistor M1 controls the magnitude of a driving current flowing from the high power voltage ELVDD to the organic light emitting diode OLED. The second transistor M2 is connected between a data line DLj and the first node N1. A control electrode of the second transistor M2 is connected to a scan line SLi. The capacitor Cst is connected between the high power voltage ELVDD and first node N1.

The organic light emitting diode OLED includes a first electrode, a second electrode, and an emission layer. The first electrode is connected to the second electrode of the first transistor M1. The second electrode is connected to a low power voltage ELVSS. The organic light emitting diode OLED emits the light based on the magnitude of the driving current flowing from the first electrode to the second electrode of the organic light emitting diode OLED.

The magnitude of the driving current may be based on Equation 1.

$$Id = \frac{\beta}{2}(ELVDD - Vdata - Vth)^2 \quad (1)$$

where Id is the driving current, $\beta$ is a constant value, ELVDD is the high power voltage, Vdata is a voltage of the data signal, and Vth is a threshold voltage of the first transistor.

The p-type MOS transistors in the pixel PXij may be turned on when an off-signal is not applied to the p-type MOS transistors. A flash of light may be recognized in part or all of the display panel when the discharging time of the DC-DC converter is long. The DC-DC converter may therefore include the discharging circuit in order to decrease the discharging time.

Figure 3:
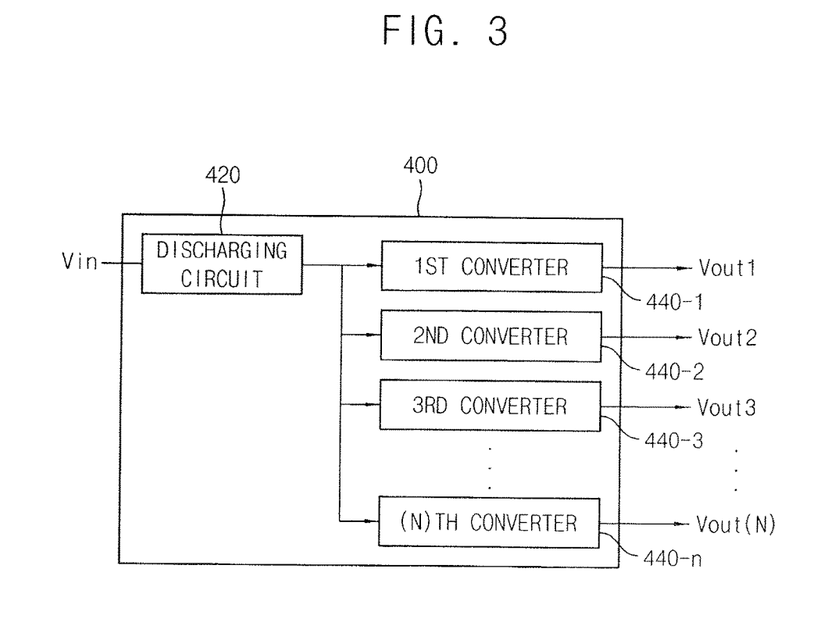
FIG. 3 illustrates an embodiment of a DC-DC converter.
Figure 4:
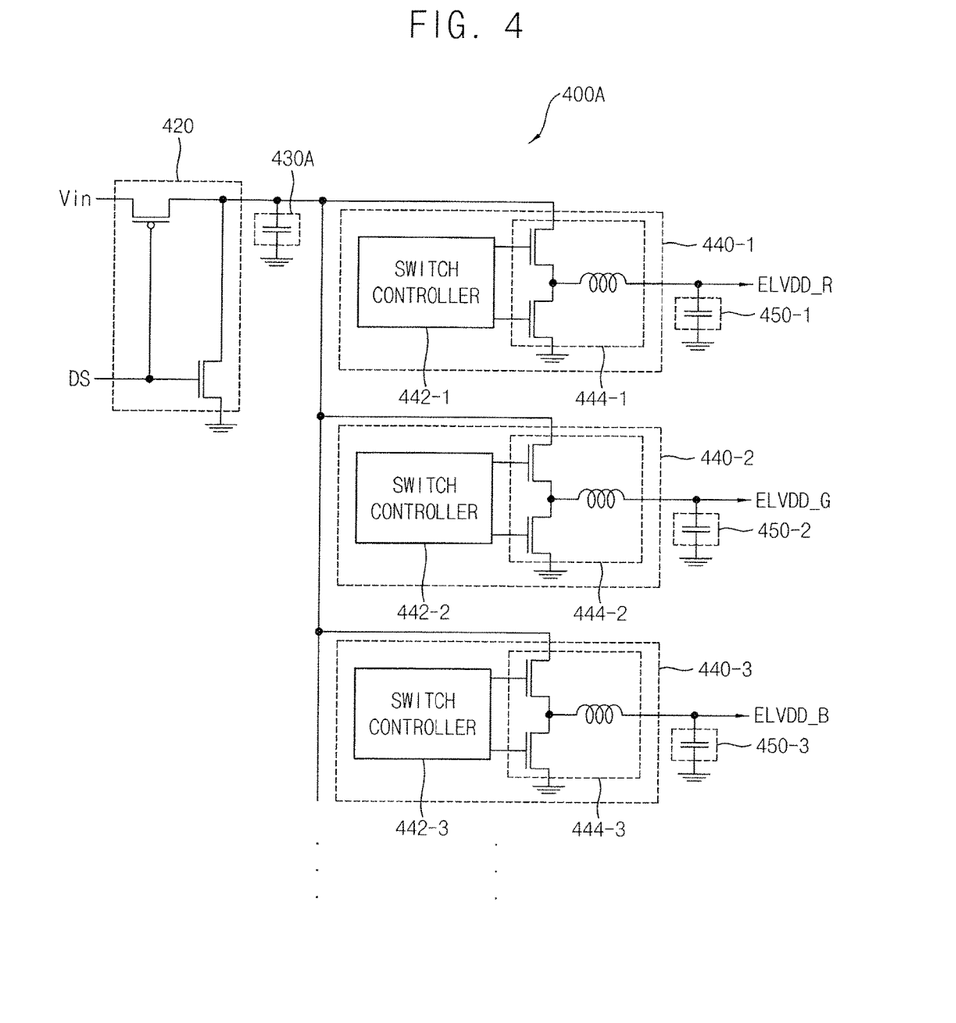
FIG. 4 illustrates a circuit embodiment of the DC-DC converter.

FIG. 3 illustrates an embodiment of a DC-DC converter 400, which, for example may be included in the display device 1000 of FIG. 1. FIG. 4 illustrates a circuit diagram embodiment of the DC-DC converter 400 in FIG. 3. Referring to FIGS. 3 and 4, the DC-DC converter 400A includes a discharging circuit 420 between an input terminal and converters 440-1 through 440-$n$, to thereby efficiently decrease the discharging time.

The discharging circuit 420 is between the input terminal and the converters 440-1 through 440-$n$. The discharging circuit 420 discharges voltages of the output terminals based on a discharging control signal. The discharging circuit 420 includes a first discharging switching element and a second discharging switching element. The first discharging switching element is connected between a first node connected to the converters 440-1 through 440-$n$ and a reference (e.g., ground) terminal. The first discharging switching element is turned on based on the discharging control signal.

The second discharging switching element is connected between the input terminal and the first node. The second discharging switching element is turned off based on the discharging control signal. When the discharging circuit 420 receives the discharging control signal, the discharging circuit 420 blocks input power voltage Vin from the input terminal using the second discharging switching element and discharges the voltages of the output terminals using the first discharging switching element.

The converters 440-1 through 440-$n$ convert the input power voltage Vin from the input terminal to the output power voltages Vout1 through Vout(N). The converters 440-1 through 440-$n$ output the output power voltages Vout1 through Vout(N) to the output terminals. For example, a first converter 440-1 converts the input power voltage Vin to a first high power voltage ELVDD_R and outputs the first high power voltage ELVDD_R to the output terminal connected to a red color pixel. A second converter 440-2 converts the input power voltage Vin to a second high power voltage ELVDD_G and outputs the second high power voltage ELVDD_G to the output terminal connected to a green color pixel. A third converter 440-3 converts the input power voltage Vin to a third high power voltage ELVDD_B and outputs the third high power voltage ELVDD_B to the output terminal connected to a blue color pixel.

In addition, one of the converters may convert the input power voltage Vin to a low power voltage and outputs the low power voltage to the output terminal connected to the pixels. Also, one or more of the converters may convert the input power voltage Vin to one or more reference voltages for gamma setting and the reference voltages may be output to the data driver.

As shown in FIG. 4, each converter 440-$n$ includes a switch controller 442-$n$ and a switching circuit 444-$n$. The switch controller 442-$n$ controls switching operations of the switching elements in the switching circuit 444-$n$. In one example embodiment, the switch controller 442-$n$ generates a pulse-width modulation (PWM) signal at a predetermined frequency to convert the input power voltage Vin to the output power voltage. The switch controller 442-$n$ controls the switching operation of the switching circuit 444-$n$ based on the PWM signal. Thus, the switch controller 442-$n$ may control a duty ratio of the switching elements in the switching circuit 444-$n$, to thereby convert the input power voltage Vin to the output power voltage. In one example embodiment, the switch controller 442-$n$ may control the switching circuit 444-$n$ to electrically connect the output terminals to the discharging circuit 420 when the discharging control signal is applied to the discharging circuit 420.

The switching circuit 444-$n$ may include a plurality of switching elements and at least one of inductor. The switching circuit 444-$n$ may convert the input power voltage Vin to one of the output power voltages by turning on or off the switch elements. In one example embodiment, the switching circuit 444-$n$ may include the switching elements and the inductor for a buck converter to output an output power voltage that is lower than the input power voltage Vin.

For example, the switching circuit 444-$n$ may include a first switching element connected between the discharging circuit 420 and a second node, a second switching element connected between the second node and a ground terminal, and a first inductor connected between the second node and one of the output terminals. In another example embodiment, the switching circuit 444-$n$ may include the switching elements and the inductor for a buck boost converter which outputs an output power voltage that is generated by inverting the input power voltage Vin. In another example embodiment, the switching circuit 444-$n$ may include the switching elements and the inductor for a boost converter to output an output power voltage that is higher than the input power voltage Vin. A variety of structures of the switching circuit 444-$n$ will be described in greater detail with reference to the FIGS. 6A through 6C.

In one example embodiment, the DC-DC converter 400A includes a plurality of output capacitors 450-1, 450-2, 450-3, . . . , between the output terminals and the ground terminal, respectively. The output capacitors 450-1, 450-2, 450-3, . . . are respectively connected to the output terminals and may charge the output power voltages to stably output the output power voltages.

In one example embodiment, the DC-DC converter 400A may further include an input capacitor 430A connected between the first node and the ground terminal. The input capacitor 430A may charge the input power voltage Vin to stably provide the input power voltage Vin to the converters 440-1, 440-2, 440-3, . . . .

Figure 5A:
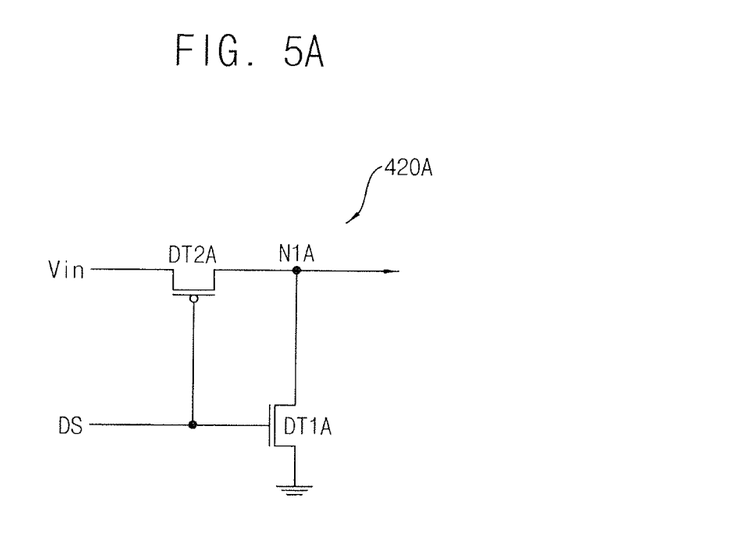
FIGS. 5A and 5B illustrate embodiments of a discharging circuit.
Figure 5B:
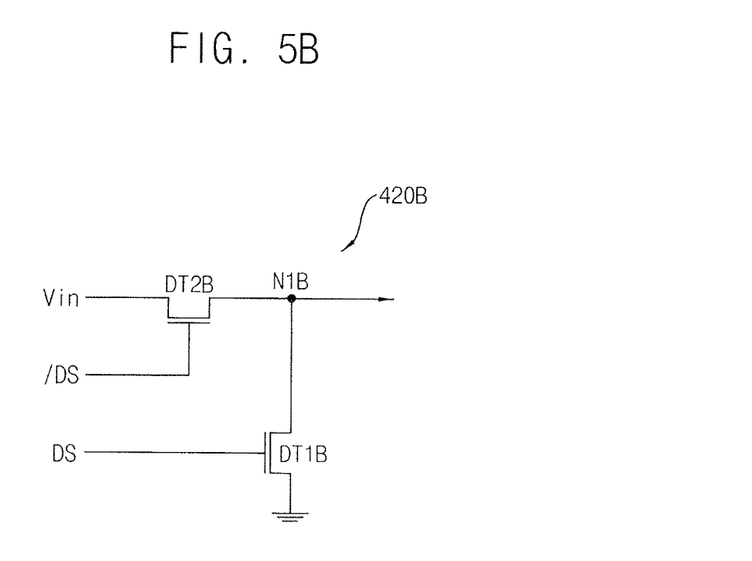

FIGS. 5A and 5B are circuit diagrams illustrating embodiments of a discharging circuit in the DC-DC converter 400 in FIG. 3. Referring to FIGS. 5A and 5B, the discharging circuit 420A/420B includes a first discharging switching element DT1A/DT1B and a second discharging switching element DT2A/DT2B. The first discharging switching element DT1A/DT1B is connected between a first node N1A/N1B connected to the converters and the ground terminal. The first discharging switching element DT1A/DT1B is turned on based on the discharging control signal DS. The second discharging switching element DT2A/DT2B is connected between the input terminal and the first node N1A/N1B. The second discharging switching element DT2A/DT2B is turned off based on the discharging control signal DS.

As shown in FIG. 5A, the discharging circuit 420A includes the first discharging switching element DT1A and the second discharging switching element DT2A that are MOS transistors of different types. For example, the first discharging switching element DT1A may be n-type MOS transistor and the second discharging switching element DT2A may be p-type MOS transistor. In this case, when the discharging control signal DS is applied to the first discharging switching element DT1A, the first discharging switching element DT1A may be turned on and voltages of the output terminals electrically connected to the first node N1A may be discharged.

When the discharging control signal DS is applied to the second discharging switching element DT2A, the second discharging switching element DT2A may be turned off and the input power voltage provided from the input terminal may be blocked. When the first node N1A is connected to the input terminal, the discharging time for the output terminals is lengthened. Therefore, discharging circuit 420A includes the second discharging switching element DT2A to efficiently decrease discharging time for the output terminals.

As shown in FIG. 5B, the discharging circuit 420B includes the first discharging switching element DT1B and the second discharging switching element DT2B that are MOS transistors of the same type. For example, the first discharging switching element DT1B and the second discharging switching element DT2B may be n-type MOS transistors. The discharging control signal DS is applied to the first discharging switching element DT1B. The inverted discharging control signal/DS is applied to the second discharging switching element DT2B. When the discharging control signal DS is applied to the first discharging switching element DT1B, the first discharging switching element DT1B is turned on and voltages of the output terminals electrically connected to the first node N1A are discharged. When the inverted discharging control signal/DS is applied to the second discharging switching element DT2B, the second discharging switching element DT2B is turned off and the input power voltage from the input terminal are blocked. When the first node N1B is connected to the input terminal, the discharging time for the output terminals may be lengthened. Therefore, the discharging circuit 420B may include the second discharging switching element DT2B to efficiently decrease the discharging time for the output terminals.

Figure 6A:
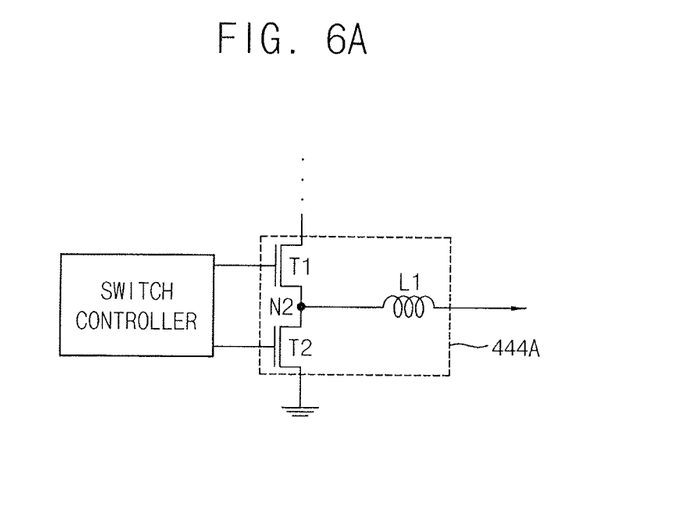
FIGS. 6A to 6C illustrate embodiments of a switching circuit.
Figure 6B:
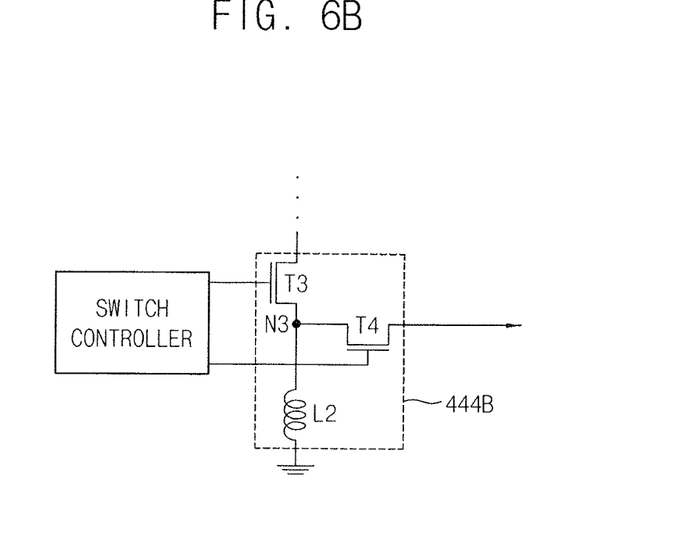
Figure 6C:
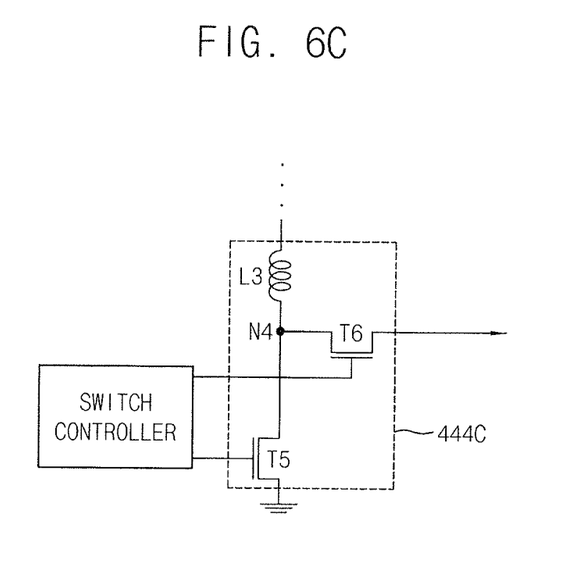

FIGS. 6A to 6C illustrate embodiments of a switching circuit, which, for example, may be included in the DC-DC converter 400 of FIG. 3. Referring to FIGS. 6A through 6C, the switching circuit includes a plurality of switching elements and at least one of inductor. The switching circuit converts the input power voltage to one of the output power voltages by turning on or off the switch elements.

As shown in FIG. 6A, the switching circuit 444A includes the switching elements and the inductor for a buck converter to output an output power voltage that is lower than the input power voltage. In one example embodiment, the switching circuit 444A includes a first switching element T1 connected between the discharging circuit and a second node N2, a second switching element T2 connected between the second node N2 and a ground terminal, and a first inductor L1 connected between the second node N2 and one of the output terminals. The first switching element T1 and the second switching element T2 are alternately turned on or off. When the first switching element T1 is turned on, the second switching element T2 is turned off. When the first switching element T1 is turned off, the second switching element T2 is turned on.

When the first switching element T1 receives the control signal from the switch controller and the first switching element T1 is turned on, the input power voltage is applied to the first inductor L1 and the output capacitor. When the second switching element T2 receives the control signal from the switch controller and the second switching element T2 is turned on, one end of the first inductor L1 may be grounded. Therefore, when the second switching element T2 is turned on, the amount of forward current flowing through the first inductor L1 may be decreased.

Therefore, the first switching element T1 and the second switching element T2 in the switching circuit 444A are alternately turned on or off to convert the input power voltage to an output power voltage lower than the input power voltage. For example, the switching circuit 444A may convert the input power voltage (e.g., 18V) to the output power voltage (e.g., 10V) and the output power voltage may be provided as the high power voltage to the pixels.

As shown in FIG. 6B, the switching circuit 444B includes the switching elements and the inductor for a buck boost converter to output an output power voltage that generated by inverting the input power voltage. In one example embodiment, the switching circuit 444B includes a third switching element T3 connected between the discharging circuit and a third node N3, a second inductor L2 connected between the third node N3 and a ground terminal, and a fourth switching element T4 connected between the third node N3 and one of the output terminals. The third switching element T3 and the fourth switching element T4 are alternately turned on or off. When the third switching element T3 is turned on, the fourth switching element T4 is turned off. When the third switching element T3 is turned off, fourth switching element T4 is turned on.

When the third switching element T3 receives the control signal from the switch controller and the third switching element T3 is turned on, current may flow through the second inductor L2. After the third switching element T3 is turned on and electromotive force is generated by the second inductor L2, the fourth switching element T4 is turned on, thereby inverting the input power voltage to generate the output power voltage. For example, the switching circuit 444B may convert the input power voltage (e.g., 4V) to the output power voltage (e.g., −5V) and the output power voltage may be provided as the low power voltage to the pixels.

As shown in FIG. 6C, the switching circuit 444C includes the switching elements and the inductor for a boost converter to output an output power voltage that is higher than the input power voltage. In one example embodiment, the switching circuit 444C includes a third inductor L3 connected between the discharging circuit and a fourth node N4, a fifth switching element T5 connected between the fourth node N4 and a ground terminal, and a sixth switching element T6 connected between the fourth node N4 and one of the output terminal. The fifth switching element T5 and the sixth switching element T6 are alternately turned on or off. When the fifth switching element T5 is turned on, the sixth switching element T6 is turned off. When the fifth switching element T5 is turned off, the sixth switching element T6 is turned on. The fifth switching element T5 is turned on and the sixth switching element T6 may be turned off by the control signal from the switch controller. Accordingly, a closed circuit may be generated between the third inductor L3 and the fifth switching element T5.

The input power voltage is applied to the third inductor L3. The magnitude of a voltage induced in the third inductor L3 may be adjusted according to the length of time the fifth switching element T5 is turned-on. Subsequently, the fifth switching element T5 may be turned off and the sixth switching element T6 may be turned on by the control signal from the switch controller. Therefore, the voltage of the third inductor L3 may be output to the output terminal as the output voltage. For example, switching circuit 444C may convert the input power voltage (e.g., 4V) to the output power voltage (e.g., 5V) and the output power voltage may be provided as the high power voltage to the pixels.

Figure 7:
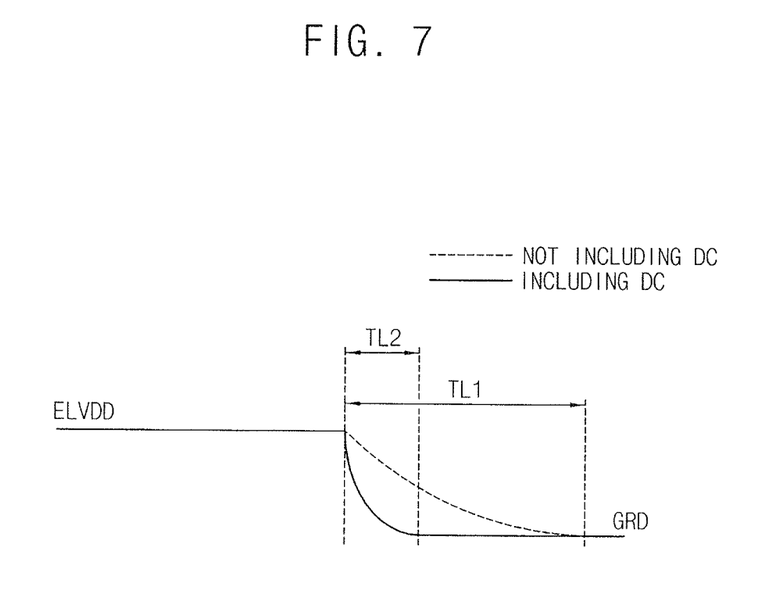
FIG. 7 illustrates an example of a discharging time.

FIG. 7 illustrates an example of the discharging time in the DC-DC converter 400 of FIG. 3. The DC-DC converter 400 may include a plurality of output capacitors respectively connected between the output terminals and a ground terminal. The capacitances of the output capacitors may be relatively large to stably maintain the output power voltage.

For example, the magnitude of the capacitance may have several thousands of microfarads.

A first comparison DC-DC converter of a first comparative example does not include a discharging circuit. As a result, when the operation of the first comparison DC-DC converter is terminated, a first discharging time TL1, in which the output power voltage ELVDD is reduced to ground level GND, may increase in proportion to magnitude of the output capacitances. For example, the first discharging time TL1 may be several tens of milliseconds. Because the first discharging time TL1 is relatively long, a flash of light may be recognized in part or all of the display device having the first comparison DC-DC converter.

In contrast, a DC-DC converter in accordance with one or more of the embodiments described herein includes a discharging circuit between the input terminal and the converters. When the operation of the DC-DC converter is terminated, a second discharging time TL2, in which the output power voltage ELVDD is reduced to ground level GND, may be short due to the discharging circuit. For example, the second discharging time TL2 may have several tens of microseconds. Therefore, the display device according to one or more of the present embodiments may reduce or prevent abnormal emission of light because the second discharging time TL2 is relatively short.

A second comparison DC-DC converter of a second comparative example discharges voltages of the output terminals using a plurality of discharging circuits respectively connected to the output terminals.

In contrast, the DC-DC converter in accordance with one or more embodiments discharges voltages of the output terminals using one discharging circuit between the input terminal and the converters. Therefore, the DC-DC converter of the present embodiments simplifies the discharging circuit, thereby reducing manufacturing costs. For example, in a display device driven by a digital driving technique, the DC-DC converter may output a red color high power voltage, a green color high power voltage, a blue color high power voltage, and a low power voltage. Further, the DC-DC converter may output reference voltages for a gamma setting to the data driver. The DC-DC converter may discharge voltages of the output terminals using one discharging circuit between the input terminal and the converters without discharging circuits connected to the output terminals.

Figure 8:
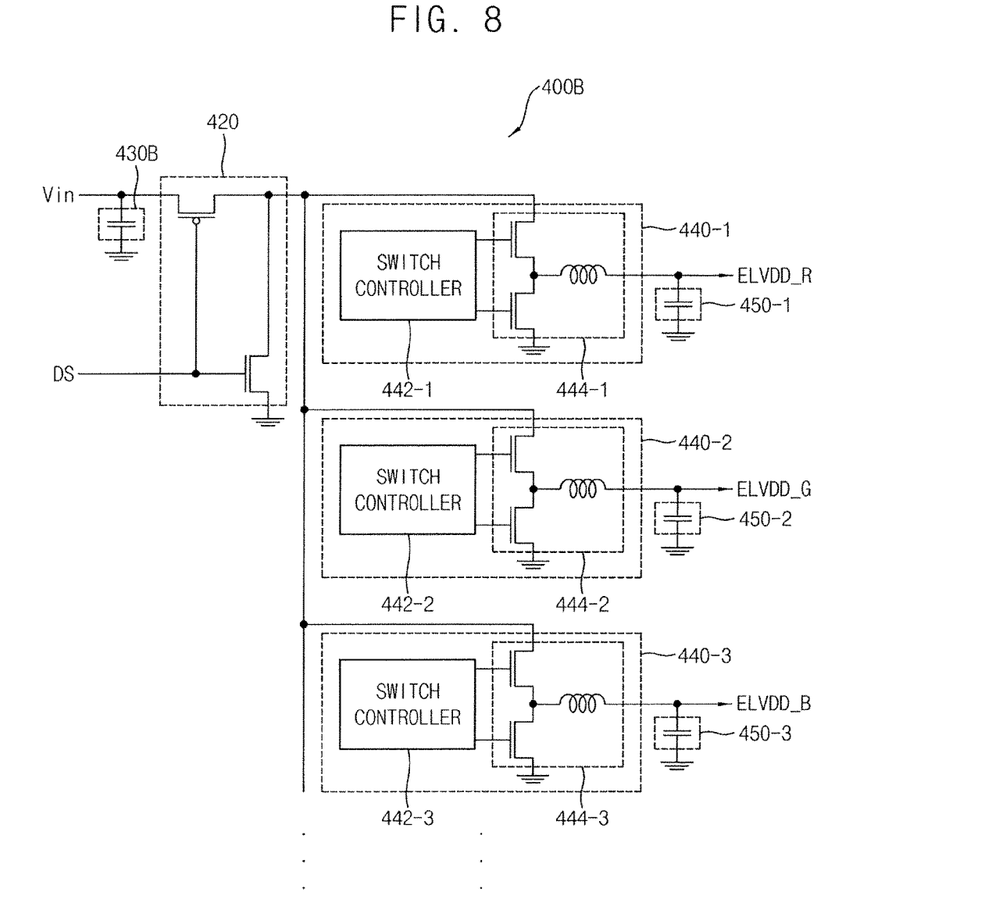
FIG. 8 illustrates another embodiment of a DC-DC converter.

FIG. 8 illustrates another embodiment of a DC-DC converter 400B which may correspond to the DC-DC converter 400 in FIG. 3. Referring to FIG. 8, the DC-DC converter 400B includes a discharging circuit 420 and a plurality of converters 440-1, 440-2, 440-3, . . . , a plurality of output capacitors 450-1, 450-2, 450-3, . . . , and an input capacitor 430B. The DC-DC converter 400B may be substantially the same as the DC-DC converter 400A in FIG. 4, except that the input capacitor 430B is connected between the input terminal and the ground terminal.

The discharging circuit 420 is between the input terminal and the converters 440-1, 440-2, 440-3, . . . . The discharging circuit 420 discharges voltages of the output terminals based on a discharging control signal. The discharging circuit 420 includes a first discharging switching element and a second discharging switching element. The first discharging switching element is connected between a first node connected to the converters and a ground terminal. The first discharging switching element is turned on based on the discharging control signal. The second discharging switching element is connected between the input terminal and the first node. The second discharging switching element is turned off based on the discharging control signal.

The converters 440-1, 440-2, 440-3, . . . , convert the input power voltage from the input terminal to the output power voltages and output the output power voltages to the output terminals. Each of the converters 440-1, 440-2, 440-3, . . . may include a switch controller and a switching circuit. The output capacitors 450-1, 450-2, 450-3, . . . , are connected to the output terminals to charge the output power voltages in order to stably output the output power voltages.

The input capacitor 430B may be connected between the input terminal and the ground terminal. Thus, the discharging circuit 420 may be located between the input capacitor 430B and the converters 440-1, 440-2, 440-3, . . . . When the discharging control signal is applied to the discharging circuit 420, the second discharging switching element in the discharging circuit 420 is turned off. When the second discharging switching element is turned off, a load of the discharging circuit 420 is reduced, and the discharging time for voltages of the output terminals may decrease because the input capacitor 430B is not discharged by the discharging circuit 420.

In the example embodiments described above, the display device is an organic light emitting display device. However, the display device may be a different type of display in another embodiment. The present embodiments may be applied to an electronic device having a display device. Examples include a cellular phone, a smart phone, a smart pad, and a personal digital assistant.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A DC-DC converter having an input terminal and a plurality of output terminals, comprising:
   a plurality of converters to convert an input power voltage at the input terminal to a plurality of output power voltages at the plurality of output terminals; and
   a single discharging circuit between the input terminal and the converters, the single discharging circuit to discharge the plurality of output power voltages at the plurality of output terminals based on a single discharging control signal, wherein the single discharging circuit includes:
      a first switch between a first node directly connected to the converters and a reference terminal, the first switch to turn on based on the single discharging control signal, and
      a second switch between the input terminal and the first node, the second switch to turn off based on the single discharging control signal,
   wherein, while the single discharging control signal is applied, the plurality of output terminals are connected to the reference terminal through the first switch such that the plurality of output power voltages at the plurality of output terminals are substantially simultaneously discharged through the first switch of the single discharging circuit.

2. The DC-DC converter as claimed in claim 1, wherein the first switch and the second switch are transistors of different types from each other.

3. The DC-DC converter as claimed in claim 1, further comprising:
an input capacitor between the first node and the reference terminal.

4. The DC-DC converter as claimed in claim 1, further comprising:
an input capacitor between the input terminal and the reference terminal.

5. The DC-DC converter as claimed in claim 1, further comprising:
a plurality of output capacitors,
wherein each of the output capacitors is between a respective one of the output terminals and the reference terminal.

6. The DC-DC converter as claimed in claim 1, wherein each of the converters includes:
a switching circuit including a plurality of switches and at least one inductor; and
a switch controller to control switching operations of the plurality of switches to convert the input power voltage to one of the output power voltages.

7. The DC-DC converter as claimed in claim 6, wherein the switching circuit includes:
a third switch between the single discharging circuit and a second node;
a fourth switch between the second node and the reference terminal; and
a first inductor between the second node and one of the output terminals.

8. The DC-DC converter as claimed in claim 6, wherein the switching circuit includes:
a fifth switch between the single discharging circuit and a third node;
a second inductor between the third node and the reference terminal; and
a sixth switch between the third node and one of the output terminals.

9. The DC-DC converter as claimed in claim 6, wherein the switching circuit includes:
a third inductor between the single discharging circuit and a fourth node;
a seventh switch between the fourth node and the reference terminal; and
an eighth switch between the fourth node and one of the output terminals.

10. The DC-DC converter as claimed in claim 6, wherein the switch controller is to control the switching circuit to connect the output terminals to the single discharging circuit based on the single discharging control signal.

11. The DC-DC converter as claimed in claim 1, wherein the plurality of second power voltages are power voltages for different color pixels.

12. A display device, comprising:
a display panel including a plurality of pixels;
a scan driver to provide a scan signal to the pixels;
a data driver to provide a data signal to the pixels; and
a DC-DC converter to generate a plurality of output power voltages to be provided to the pixels, and having an input terminal and a plurality of output terminals, wherein the DC-DC converter includes:
a plurality of converters to convert an input power voltage at the input terminal to the plurality of output power voltages at the plurality of output terminals; and
a single discharging circuit between the input terminal and the converters, the single discharging circuit to discharge the plurality of output power voltages at the plurality of output terminals based on a single discharging control signal, wherein the single discharging circuit includes:
a first switch between a first node directly connected to the converters and a reference terminal, the first switch to turn on based on the single discharging control signal, and
a second switch between the input terminal and the first node, the second switch to turn off based on the single discharging control signal,
wherein, while the single discharging control signal is applied, the plurality of output terminals are connected to the reference through the first switch of the single discharging circuit such that the plurality of output power voltages at the plurality of output terminals are substantially simultaneously discharged through the first switch of the single discharging circuit.

13. The display device as claimed in claim 12, wherein the DC-DC converter further includes an input capacitor between the first node and a reference terminal.

14. The display device as claimed in claim 12, wherein the DC-DC converter further includes an input capacitor between the input terminal and a reference terminal.

15. The display device as claimed in claim 12, wherein the DC-DC converter further includes:
a plurality of output capacitors,
wherein each of the output capacitors is between a respective one of the output terminals and a reference terminal.

16. The display device as claimed in claim 12, wherein:
the pixels include a red color pixel, a green color pixel, and a blue color pixel, wherein the DC-DC converter is to provide the output voltages to the red color pixel, the green color pixel, and the blue color pixel, respectively, and wherein the output voltages are different from one another.

17. A DC-DC converter having an input terminal and a plurality of output terminals, comprising:
a plurality of converters to convert a first power voltage at the input terminal to a plurality of second power voltages for output to pixels of a display device through the plurality of output terminals; and
a single discharging circuit to discharge the plurality of second power voltages at the plurality of output terminals based on a single discharging control signal, wherein the second power voltages are different from one another and wherein the single discharging control signal is generated when a power mode of the display device switches from a first state to a second state, wherein the single discharging circuit includes:
a first switch between a first node directly connected to the converters and a reference terminal, the first switch to turn on based on the single discharging control signal, and
a second switch between the input terminal and the first node, the second switch to turn off based on the single discharging control signal,
wherein, while the single discharging control signal is applied, the plurality of output terminals are connected to the reference terminal through the first switch of the single discharging circuit such that the plurality of second power voltages at the plurality of output terminals are substantially simultaneously discharged through the first switch of the single discharging circuit.

\* \* \* \* \*